G. L. CADY,
Assignor to C. C. Post.
Sap Spout.
No. 9,394. Reissued Oct. 5, 1880.
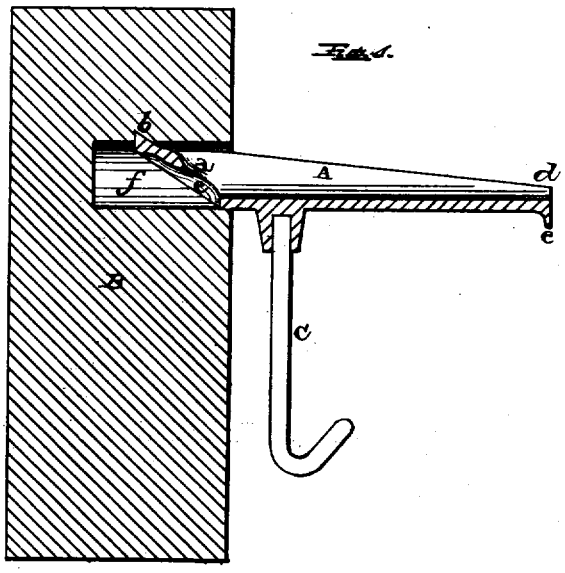
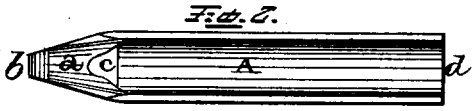
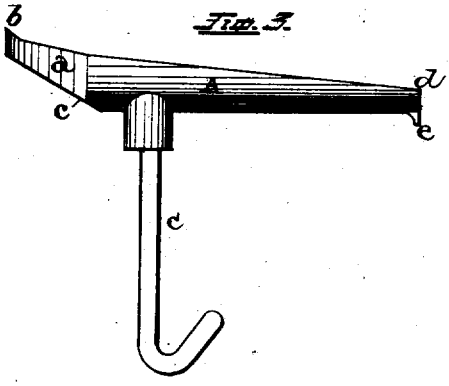
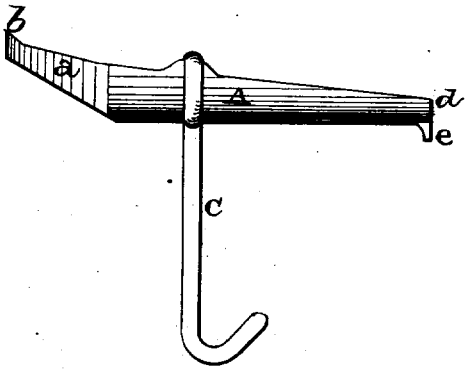
Witnesses:
W. W. Mortimer,
Will H. Kern.
Inventor:
Geo. L. Cady,
per
C. E. Allen,
Att'y.
N. PETERS, PHOTO-LITHOGRAPHER, WASHINGTON, D. C.

UNITED STATES PATENT OFFICE.

GEORGE L. CADY, OF LOWELL, MASSACHUSETTS, ASSIGNOR TO CHARLES C. POST, OF BURLINGTON, VERMONT.

SAP-SPOUT.

SPECIFICATION forming part of Reissued Letters Patent No. 9,394, dated October 5, 1880.

Original No. 98,026, dated December 21, 1869. Application for reissue filed June 30, 1880.

*To all whom it may concern:*

Be it known that I, GEORGE L. CADY, of Lowell, in the county of Middlesex and State of Massachusetts, have invented certain new and useful Improvements in Sap-Spouts; and I do hereby declare that the following is a full, clear, and exact description of the invention, that will enable others skilled in the art to which it appertains to make and use the same, reference being had to the accompanying drawings, and to the letters of reference marked thereon, which form a part of this specification.

My invention relates to the construction and arrangement of a sap-spout and bucket-hanger by which a free flow of sap is obtained and the same is carried at once into the bucket without detention. It is simple and durable in construction, new and useful in its design.

In the drawings similar letters refer to similar parts.

Figure 1 is a vertical section of my invention. Fig. 2 is a plan view of the same. Figs. 3 and 4 are side elevations of the spout, showing different forms of hooks.

A is the spout. It is made of any suitable material, is semicircular in form, and of the length and taper required. The end *a*, designed to enter the tree, turns upward and terminates in the spur *b*. It is concave in form, having at the bottom of its bowl an opening, *c*, through which the sap has a free passage from the tree B into and through the entire length of the spout A to its outer extremity or nose, *d*, from the bottom or under side of which projects the lip *e*, over which the sap is carried at once to the bucket below.

Attached to the spout A, either permanently, as shown in Fig. 3, or movable, as shown in Fig. 4, is the bucket hanger or hook C. This is secured to the spout between the ends *a* and *d*, so as to hang a short distance from the tree.

In operation the inclined part *a* of the spout A is inserted into the hole *f*, which has been previously prepared in the tree B, the end or nose *d* being first inclined upward, so that the end of the spout A rests against the fibers of the tree B. The nose *d* is then pressed downward, which operates to force the spur *b* into the upper portion of the hole *f*, so that only those fibers of the tree which come into immediate contact with this point of the device are in the least mutilated or contracted, thus avoiding the liability to wedge up or otherwise injure the fibers of the tree and impede the flow of sap, which usually attends the use of the ordinary sap-spout. The bucket is then hung upon the hanger or hook C. Its weight not only assists in retaining the spout A in position, but also in more perfectly packing the spout where it comes in contact with the tree B. The sap enters the spout through the opening *c*, its escape being prevented by the concave shape of the end *a*. The spout A being inclined downward the sap runs toward the nose *d*, whence, by the aid of the lip *e*, which projects below the bottom of the nose *d*, it is at once carried directly into the bucket, thus leaving the channel of the spout always clean and free from sap. Without this lip to direct the flow the sap is liable either to stop at the nose *d*, at the end of the spout, and there remain, freezing or souring, until a sufficient quantity accumulates to compel it to leave the spout. Or, instead of dropping from the end of the spout, it is carried back along the under side of the spout, there eventually to become injured in quality by standing, or wasted upon the ground. In either case the spout as well as the sap becomes tainted and the quality of the sugar correspondingly affected.

To enable me to use hangers of different lengths I provide a movable hanger or hook, C, as shown in Fig. 4 of the drawings, the spout A being always held in position by the weight of the bucket with contents.

To remove the spout from the tree the spur *b* is loosened from the fibers which surround it by raising the nose *d*. The spout can then be readily withdrawn without danger of serious damage to the spout or the tree, necessarily incident to those spouts which are held by being firmly driven into the tree, a mode that not only impedes the flow of the sap by the consequent wedging of the fibers, but also renders the removal of the spout extremely difficult without injury to it as well as the tree.

What I claim, and desire to secure by Letters Patent, is—

1. The sap-spout constructed with an inclined end, *a*, of concave form, having an opening, *c*, and terminating in a spur, *b*, substantially as and for the purpose set forth.

2. The sap-spout A, constructed with a nose, *d*, provided with a lip, *e*, the other extremity being inclined in the reverse direction from the lip, substantially in the manner shown, and for the purpose described.

3. A sap-spout having a lip, *e*, projecting from the under side of the outer end to lead the sap directly to the bucket, substantially as shown.

4. The combination of the spout A, spur *b*, and hanger C, constructed and arranged to operate together, substantially as and for the purpose herein specified.

In testimony that I claim the foregoing I have hereunto set my hand this 3d day of June, 1880.

GEO. L. CADY.

Witnesses:
GEO. H. STEVENS,
FRED WOODIES.